UNITED STATES PATENT OFFICE.

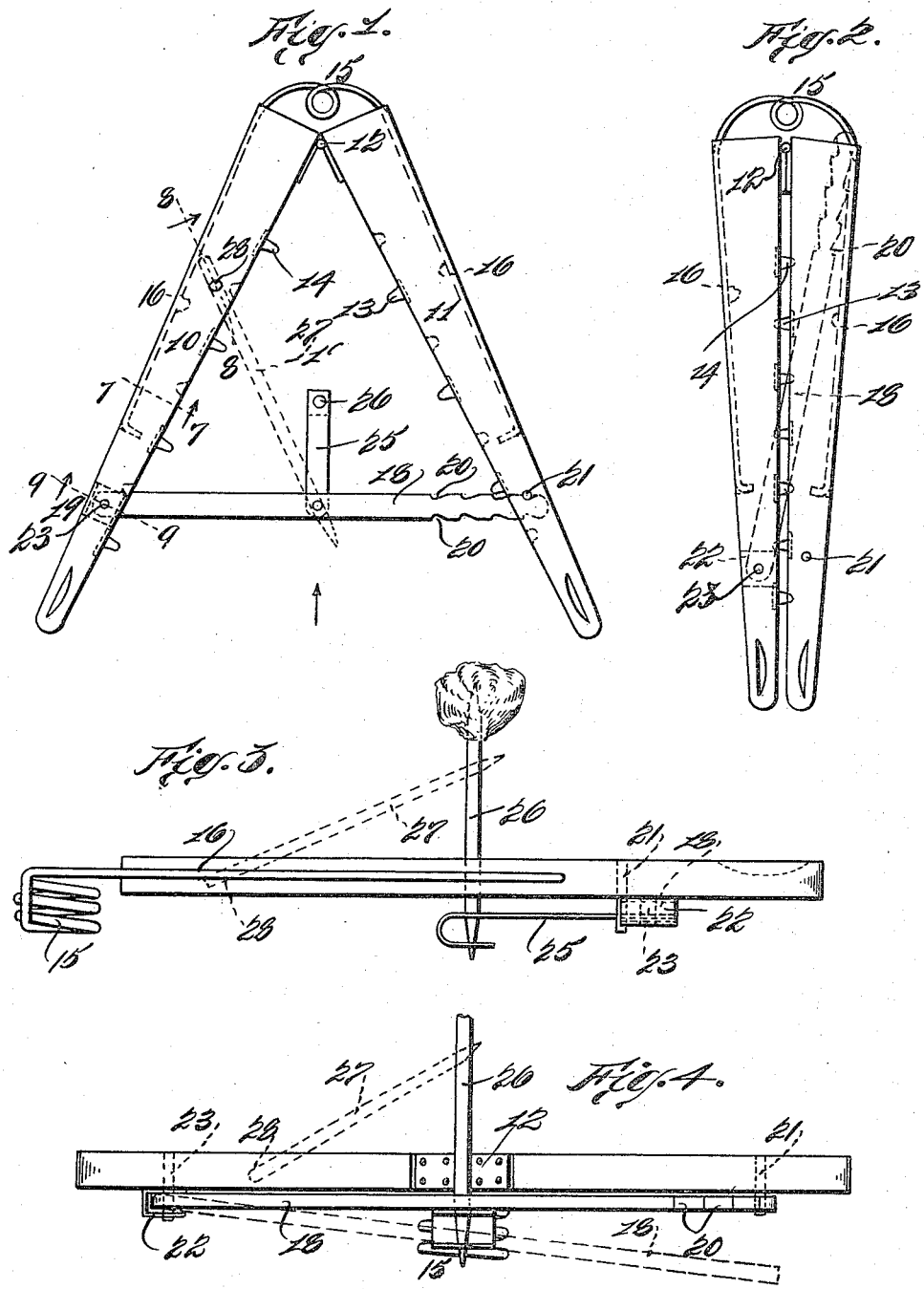

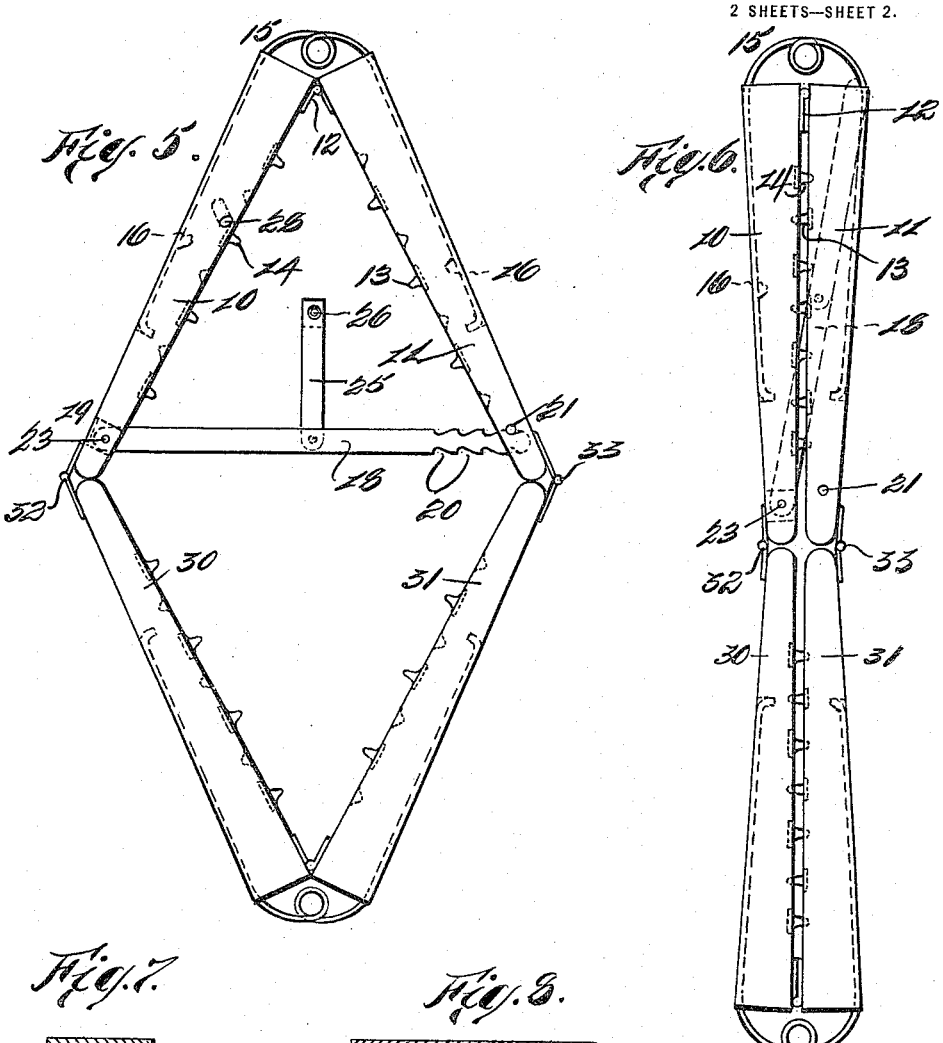
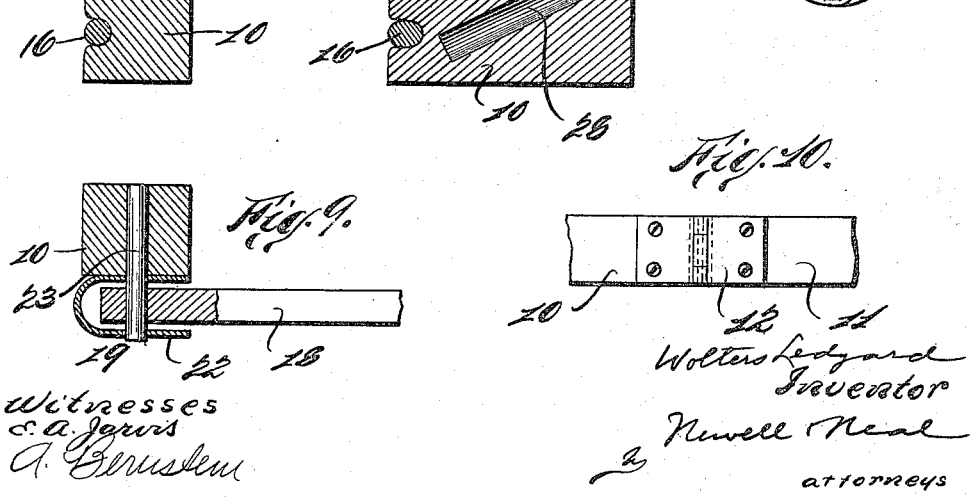

WOLTERS LEDYARD, OF CAZENOVIA, NEW YORK, ASSIGNOR TO ELIPHALET REMINGTON, OF CAZENOVIA, NEW YORK.

ANIMAL-TRAP.

1,160,622.  Specification of Letters Patent.  Patented Nov. 16, 1915.

Application filed June 20, 1914.  Serial No. 846,239.

*To all whom it may concern:*

Be it known that I, WOLTERS LEDYARD, a citizen of the United States, residing at Cazenovia, Madison county, New York, have invented certain new and useful Improvements in Animal-Traps, of which the following is a clear, full, and exact description.

This invention relates to animal-traps of the class more particularly adapted for catching such animals as muskrats and mink.

One of the objects of the invention is to provide an animal trap which is adapted to float on the surface of the water and to hold the bait above the water in such position that, as for instance, a muskrat or a mink in swimming up to the trap will be apt to spring the same due to the effort to reach the bait.

Other objects of the invention are to provide practical, efficient and simple means for trapping animals whether on land or in the water.

These being among the general objects of the present invention, the same consists of certain features of construction and combinations of parts to be hereinafter described and then claimed with reference to the accompanying drawings showing suitable embodiments of the invention, in which drawings—

Figure 1 is a plan view of the improved trap showing the same set; Fig. 2 is a similar view showing the parts of the trap folded together; Fig. 3 is a side view of Fig. 2, enlarged; Fig. 4 is an enlarged end view of Fig. 1 looking in the direction of the arrow; Figs. 5 and 6 are plan views of a modified form of the invention showing respectively a trap set and a trap after being sprung; Figs. 7, 8 and 9 are sectional details on lines 7—7, 8—8, and 9—9 of Fig. 1; and Fig. 10 is an enlarged side view at 10—10 of Fig. 6.

Referring to the drawings, the catching members 10, 11 of the trap are pivoted together at 12, like a pair of dividers, so as to constitute a pair of pivoted jaws or members which are provided at their adjacent inner faces with fangs or teeth 13, 14, which when the jaws are closed together, are adapted to catch and hold the animal. Preferably the teeth are in staggered position with respect to each other, and preferably the ends of the teeth enter corresponding holes or recesses in the inner faces of the jaws so that the jaws may be folded snugly together.

The closed position of the jaws is shown in Fig. 2 and the open position in Fig. 1. The jaws are held in the former position by spring tension and are brought to closed position by the same. The spring means employed for this purpose preferably consists of helical coil 15 of spring wire, the ends of which are formed with extensions 16 which run a suitable distance along grooves in the outer sides of the jaws, the ends 17 of said extensions being bent inwardly and anchored in the material of the jaws.

The trigger 18 for the jaws is pivoted at one end preferably near the outer end of one of the jaws at 19, while the free end of the trigger 18 is provided with beveled teeth 20, preferably at each side of said end, which teeth are adapted to be brought into engagement with a pin 21 on the other jaw. As shown, the pivot connection for the trigger 18 is provided by means of a clip 22, into which enters the pivot end of the trigger, and a pivot pin 23 is firmly fixed in the jaw and the end of clip 22. Inasmuch as the improved trap is intended for use in the water as well as on land,—for which reason its position in use may be changed,—it is desirable that there be a slight space between the pivoted end of the trigger and the jaw and clip, and that the hole to receive the pivot be somewhat enlarged, so as to permit the trigger to be moved from the full line position shown in Fig. 4, to the dotted line position. In the full line position the trap is set as in Fig. 1, but in the dotted line position the trigger has been released so that the trap will be sprung.

The means for holding the bait may be of suitable construction, but its bait-holding end is preferably so disposed as to locate the bait within the three sides of the triangle formed by the jaws and the trigger 18. To this end either the trigger 18 may carry at its mid-length a bracket 25, on which is mounted a bait-stick 26, having a jointed end extending away from the plane of the jaws; and jaw 10 may have an inclined hole 28 in which the same bait stick 26 may be inserted so that it will have the inclined position shown in dotted lines at 27 in Figs. 1, 3 and 4.

A slight modification is shown in Figs. 5 and 6, from which it will be seen that in addition to the described parts there are provided an additional pair of spring-actuated pivoted jaws 30, 31, the ends of which are pivotally connected at 32, 33 with the jaws 10, 11. Under this form of the invention a floating four-sided spring-tensioned jaw-frame is provided, which is held distended by the trigger when the trap is set. When the parts are folded together they appear as in Fig. 6.

An important feature of the invention resides in the fact that the above-described construction of trap or its equivalent may readily be made to float on the water. When the trap is intended to float, the jaws or members 10, 11 are composed either partly or entirely of wood or other suitable material which will cause the trap to float. When the trap is floated, the embodiment of the invention shown will of course be in substantially horizontal position and should be anchored as by means of a cord or the like attached as to the loop or coil 15. When so anchored the head of the trap will be directed up-stream and a muskrat or mink swimming toward the trap to get the bait will in all likelihood press down upon the trigger with one of its fore paws so that it can reach the bait, which is elevated above the water by the bait-stick. Upon pressing down on the trigger 18 the same is instantly tripped and released, said trigger being moved in a direction away from the plane of the spring-actuated jaws of the trap. By adapting the trigger to the trap in substantially the manner shown, the trigger is rendered very sensitive to slight downward pressure, especially when the trap is used on the water, it being then in horizontal position, or nearly so. Said trigger can also set the trap independently of the bait-holding means, which in the floating position of the trap is located above the trigger.

What I claim is:

1. In an animal trap, the combination of spring-actuated jaws, a trigger for setting said jaws, said trigger being sensitive to slight downward pressure for springing said trap, and bait-holding means, said trap being composed in part at least of buoyant material, exemplified by wood, for floating it, and in the floating and operating position of which trap the receiving end of said bait-holding means stands at a point above said trigger and the submerged part of said buoyant material, said trigger being adapted to set said trap independently of said bait-holding means.

2. In an animal trap, the combination of bait-holding means, means, comprising jaws, for establishing the buoyancy of said trap and adapted when the trap is floating to support the receiving portion of said bait-holding means at a point upwardly from the submerged part of said buoyant means, and a sensitive trigger for setting said trap independently of said bait-holding means and positioned beneath said receiving portion of said holding means when said trap is in floating position.

3. In an animal trap, the combination of spring-actuated connected jaws composed in part at least of buoyant material, whereby to float the trap, a trigger adapted to set said trap independently of its bait-holding means, and arranged so that it is located transversely of and adjacent the outer ends of the jaws when the trap is set, and said bait-holding means located to hold the bait between the ends of but above said trigger, said trigger being responsive to a slight pressure downwardly to spring the trap.

4. In an animal trap, the combination of spring-actuated jaws, a bait holder, and a trigger pivotally mounted at one end on one of said jaws and having a play on its pivot, independent of its pivotal movement, laterally of the plane of action of said jaws, a part of said trigger having engagement sensitively with the other of said jaws, whereby said trigger may be released from the latter jaw when moved laterally, and said trigger being adapted to set said trap independently of said bait-holding means.

5. An animal trap comprising a pair of tripable gripping jaws, a bait holder extending outwardly from one of said gripping jaws to a point beyond the path of movement of said jaws.

Signed at Cazenovia, N. Y., this 15th day of June, 1914.

WOLTERS LEDYARD.

Witnesses:
CORA L. FLETCHER,
R. J. GOFF.

Copies of this patent may be obtained for five cents each, by addressing the "Commissioner of Patents, Washington, D. C."

It is hereby certified that in Letters Patent No. 1,160,622, granted November 16, 1915, upon the application of Wolters Ledyard, of Cazenovia, New York, for an improvement in "Animal-Traps," errors appear in the printed specification requiring correction as follows: Page 1, line 100, for the word "jointed" read *pointed;* page 2, line 17, for the word "embodiment" read *embodiments;* and that the said Letters Patent should be read with these corrections therein that the same may conform to the record of the case in the Patent Office.

Signed and sealed this 7th day of December, A. D., 1915.

[SEAL.] R. F. WHITEHEAD,

*Acting Commissioner of Patents.*

Cl. 43—23.